United States Patent [19]

El-Sayed

[11] 4,237,003
[45] Dec. 2, 1980

[54] PROCESS FOR BIOLOGICAL PURIFICATION OF LIQUID WASTES

[76] Inventor: Refaat M. El-Sayed, Näsbydalsvägen 14, Täby, Sweden, 18 331

[21] Appl. No.: 904,241

[22] Filed: May 9, 1978

[30] Foreign Application Priority Data

May 9, 1977 [SE] Sweden .............................. 7705386

[51] Int. Cl.³ .............................................. C02F 3/04
[52] U.S. Cl. ....... 210/606; 210/630; 210/610; 210/617 435/813; 435/819; 435/183
[58] Field of Search ......................... 210/2, 11, 15–17, 210/150, 151, 8; 195/2, 3, 66 R, 65, 116, 115

[56] References Cited

U.S. PATENT DOCUMENTS

| | | | |
|---|---|---|---|
| 1,751,459 | 3/1930 | Simmer | 210/11 |
| 3,617,541 | 11/1971 | Pan | 210/17 |
| 3,801,499 | 4/1974 | Luck | 210/11 |
| 3,994,780 | 11/1976 | Klass et al. | 210/11 |
| 4,088,571 | 5/1978 | Helgesson | 210/17 |

FOREIGN PATENT DOCUMENTS

| | | | |
|---|---|---|---|
| 2424116 | 11/1975 | Fed. Rep. of Germany | 210/11 |
| 2633514 | 2/1978 | Fed. Rep. of Germany | 210/11 |

OTHER PUBLICATIONS

El-Sayed, Refaat M., "Biologically Active Filter Combined with Enzyme Treatment", A.I.Ch.E. Symp. Series, vol. 73, (167), pp. 166–171, (Mar. 1977).

Primary Examiner—Benoit Castel
Attorney, Agent, or Firm—Burns, Doane, Swecker & Mathis

[57] ABSTRACT

An improved process for biological purification of liquid wastes is provided. The improvement is obtained by utilizing anaerobic bacteria in the presence of extra-cellular enzymes produced by Gram-positive bacteria and separated from said Gram-positive bacteria and the intra-cellular enzymes contained therein. As compared to the current technique the anaerobic process according to the invention may produce only 0.2% of sludge, while the retention time may be only 25% of the time currently used.

10 Claims, 3 Drawing Figures

PROCESS FOR BIOLOGICAL PURIFICATION OF LIQUID WASTES

The present invention relates to a process for biological purification of liquid wastes, e.g. waste waters, which comprises contacting, in some kind of biological bed, the wastes with active micro organisms, that is organisms which cause a breakdown or degradation of the organic impurities present in the wastes.

The biological purification or the biological step in the treatment of waste waters and other liquid wastes today is based almost entirely on the use of aerobic micro organisms, bacteria and air being mixed with the waste waters and the aerobic bacteria breaking down the organic material in the waters. The reasons why an aerobic process is used are reliability, creation of a stable system and rapid growth of the aerobic bacteria. However, it should be noted that the aerobic process is associated with two great disadvantages, viz. partly that it demands a long retention time, partly that it causes large amounts of sludge.

As to the retention time, it is of the order of 5–11 hours for normal municipal waste waters and industrial waste waters, and in many cases even longer. As the retention time in the biological step determines the size of the plant, this means unnecessarily large plants and high operation costs.

As to the amount of sludge, a rule of thumb is that 1 kg of organic wastes in water gives 5 kg of sludge in the aerobic process. Thus, the aerobic systems give large amounts of sludge, which are also difficult to dewater or drain. The large amounts of sludge formed in the aerobic water purification have become a very great problem.

The fact that the aerobic process is the process used in spite of the above mentioned disadvantages clearly shows that an anaerobic process sofar has been considered to have even greater disadvantages. The dominating disadvantages have been that the growth of anaerobic bacteria is very slow and that the activity of the anaerobic bacteria is strongly reduced in the presence of various substances such as oxygen.

According to the present invention, it has unexpectedly turned out possible to reduce or eliminate those problems which have previously been associated with aerobic as well as anaerobic processes. This is accomplished through the fact that the process according to the invention has been given the characteristics as as set forth below.

The process according to the invention has been shown to enable a very short retention time in the biological bed and an extremely low formation of sludge, while at the same time obtaining a rapid growth of micro organisms. Furthermore, in the process according to the invention it is possible to use a biological bed, wherein any disturbing influence of oxygen can be substantially eliminated.

As mentioned above, in aerobic processes the retention time is on the order of 5–11 hours and the amount of sludge formed is about $5 \times$ the weight of BOD (biochemical oxygen demanding substance). According to the present invention, it has become possible to reach a retention time of about 1–3 hours and an amount of sludge of $0.01 \times$ the weight of BOD. In view of the fact that the retention time is reduced to about 25% of the time required for aerobic treatment, smaller plants can be built, which means reduced building costs and, of course, also reduced costs for operation and maintainance. Other considerable cost reductions are apparent from the fact that the formed amount of sludge is only about 0.2% of the amount of sludge formed according to the current aerobic technique.

Thus, in the anaerobic process according to the invention the end products are to a much smaller extent solid materials and consist instead of gases, such as $H_2$, $CO_2$, $N_2$, $CH_4$, and $H_2S$.

Thus, the process according to the invention is based on the fact that the biological step per se, that is the purification in the biological bed, is carried out under substantially anaerobic conditions by using anaerobic bacteria as those micro organisms which cause a degradation of the organic impurities. This is of course previously known per se, but as was mentioned above it has not come to any practical use worth mentioning, due to the above-mentioned disadvantages.

However, these disadvantages are eliminated according to the invention by the use in the biological bed of certain special enzymes, which have been produced and separated in a special way. Thus, in this context, the term "enzymes" does not refer to the enzymes formed by the micro organisms used in the biological bed but to externally added enzymes, which have been produced and separated in a prior separate step.

In a living cell, two types of reactions take place at the same time, namely an energy-producing degradation process, so called catabolic reactions, and an energy-consuming building process, so called anabolic reactions. These reactions are intimately associated with each other and take place at the same time in each cell. Those reactions which take place during the metabolism of the cell are catalysed—accelerated—by certain enzymes, which can work either inside the cell—so called intra-cellular enzymes—or outside the cell—so called extra-cellular enzymes.

The use of enzymes as biocatalysts in the treatment of organic impurities in waste waters has been studied (see e.g. "Sewage and Industrial Wastes", 26, 9, 1954 page 1162 and 29, 9, 1959 page 1066 and WU, Y.C., "Clarification of Bookmill Effluent by Enzyme-alum", Amer. Soc. Civ. Engrs. Envir. Eng. Div., 100, EE3, 541–548 (1974)), but said use has not been shown to give any substantial effects on the purification. The reason therefor seems to be that when adding the enzymes, mixtures of extra- and intra-cellular enzymes have been added, which have substantially balanced the activities of each other. Furthermore, for the above-mentioned reasons one has virtually exclusively worked with aerobic micro organisms only, which obviously themselves form relatively strong enzyme systems, which apparently cannot be substantially influenced, i.e. improved. The same seems to be applicable to the process disclosed in U.S. Pat. No. 3,801,499. According to the patent, the purification takes place in several steps, one essential step of the purification being an initial rise of the pH, which is made by the addition of alkali. The purpose of said pH-rise is to accomplish a burst of the cell walls of the micro organisms present in the waste waters and to liberate those intra-cellular enzymes which are present within the cells; however at the same time the treatment leads to a destruction of the extra-cellular enzymes. In a subsequent step, the liberated intra-cellular enzymes are allowed to affect and partly degrade the organic impurities contained in the water. During this degradation process more enzymes can be added, but the process is mainly based on the use of intra-cellular enzymes. The disadvantages are the same as mentioned above and the times required for treatment are also very long and completely unrealistic for industrial uses.

As concerns anaerobic processes, the problem is that the anaerobically active bacteria form relatively weak enzyme systems outside the cells, especially due to the slow adaptation of the anaerobic bacteria. Because of the weak enzyme systems, the ability of the bacteria to take up nutrition is restricted, which in the present case means reduced ability of degrading organic materials in water.

However, by the present invention it has been unexpectedly shown possible to considerably reinforce the enzyme systems of the anaerobic bacteria, namely by adding to the active anaerobic bacteria in the biological bed, a suspension of extra-cellular enzymes, which has been produced by and separated from Gram-positive bacteria. In principle, this means that it has now become possible to utilize those strong enzyme systems which are developed by aerobic bacteria to reinforce the weak enzyme systems of the anaerobic bacteria, and this in spite of the fact that the purification is performed under anaerobic conditions. The process according to the invention also shows the advantages which have previously been associated with aerobic as well as anaerobic processes, and at the same time the disadvantages of these two methods are eliminated.

According to the invention, the suspension of extra-cellular enzymes is produced by cultivation in a first step of Gram-positive bacteria in an aerobic environment that is rich in nutrition.

In view of the fact that the bacteria have a good supply of nutrition and oxygen, they produce intra-cellular enzymes inside the cell as well as extra-cellular enzymes in the solution surrounding the cell. In a second step the suspension of bacteria thus produced together with the surrounding extra-cellular enzymes is transferred to an environment with low content of nutrition, whereby the bacteria will enter into a so called dead phase because of lack of nutrition, and their activity and enzyme production will decrease. At this time the interaction between the intra- and extra-cellular enzymes will cease. The bacteria will lose their charge and settle, while the negatively charged extra-cellular enzymes will float in the suspension. The suspension will separate into two layers, a lower layer with bacteria in the dead phase enclosing the intra-cellular enzymes and an upper layer with the negatively charged extra-cellular enzymes. In this way it will thus be possible to separate the suspension with extra-cellular enzymes from the suspension of bacteria with the intra-cellular enzymes enclosed therein. Due to lack of nutrition the separated bacteria will break down very slowly and they can be removed from the separation tank fairly slowly without the risk of intra-cellular enzymes being liberated in the suspension.

According to a preferred embodiment of the invention, the suspension of extra-cellular enzymes which is added to the biological bed should contain at least 90% by weight, preferably at least 95% by weight, and especially at least 99% by weight of extra-cellular enzymes, calculated on the total enzyme content. The proportion of extra-cellular enzymes can easily be adjusted by a person skilled in the art by adjustment of the number of bacteria per amount of nutrition solution, since generally the amount of intra-cellular enzymes produced is constant, while the amount of produced extra-cellular enzymes varies with the supply of nutrition. Generally the ratio between the amount of extra-cellular enzymes and the amount of intra-cellular enzymes is 10:1. Thus, even if all the intra-cellular enzymes were liberated from the bacteria settled in the separation tank, the amount of extra-cellular enzymes in the suspension would still exceed 90%. As the bacteria degrade very slowly, as was mentioned above, the amount of extra-cellular enzymes in the suspension is in fact higher, closer to 100% then to 90%.

According to an especially preferred embodiment of the invention, the Gram-positive bacteria are cultivated in a first tank in an aerobic environment rich in nutrition, whereupon the produced suspension is passed to a second tank with poor nutrition, a tube which leans obliquely upwards from the first tank, preferably with an angle of between 30° and 60°, especially 45°, being used. In this way the environment in the leaning tube will gradually become poorer in nutrition and bacteria, which may follow up in the tube, will, through suitable choice of retention time, enter into the so called dead phase and settle in the tube and thereby fall back into the first tank, which means that a very clean suspension of extra-cellular enzymes can be obtained in the second tank.

The choice of specific enzymes or mixtures thereof depends on the composition of the liquid wastes to be purified which in turn depends on the organic impurities to be degraded. Thus, in the case of e.g. starch-containing materials, which contain i.a. amylose, amylase is used as the enzyme, and so forth. In each specific case, the kind of enzyme is easily chosen by a person skilled in the art. As in most cases, the liquid wastes contain impurities of many different kinds, which thereby indicates the use of many different types of enzymes.

According to still another especially preferred embodiment of the invention, the suspension of the extra-cellular enzymes is added to the liquid wastes in a special mixing tank before the wastes are passed into the biological bed. The time of treatment in the mixing tank is preferably maintained between 10 and 30 minutes. The initial treatment in the mixing tank has shown to cause a degradation of high molecular weight material in the wastes to a lower molecular weight material, which can more easily and rapidly be degraded in the biological bed.

According to the invention, it has turned out that relatively small amounts of exteriorly added extra-cellular enzymes reinforce the enzyme systems of the anaerobically active bacteria whereby the anaerobic bacteria can rapidly degrade the organic impurities.

The extra-cellular enzymes are preferably added in the form of an aqueous solution or suspension having an activity of 60%. The method of determining this activity, which is in principle a measure of viscosity relative to the viscosity of pure water, is described in Fischer, E. H. & Stein, E. A., The Enzymes, 2nd edition, Vol. 4, p. 345, 1960.

A solution having an activity of 60% contains about 0.01 mg of extra-cellular enzymes per liter of solution. Especially favourable results have been achieved when using between 0.25 and 5 ml of this solution per liter of liquid wastes, which means between $0.25 \times 10^{-5}$ and $50 \times 10^{-5}$ mg of extra-cellular enzymes per liter of liquid wastes.

An addition of about $10^{-5}$ mg of extra-cellular enzymes per liter of wastes has been shown to be enough for wastes with a BOD of up to about 900. When the BOD-value is higher, it can often be more favourable to increase the retention time than to add more enzymes.

When using a retention time of up to about 3 hours and an addition of enzymes of about $10^{-5}$ mg/l, normal waste waters with a BOD-value of up to approximately 7000 can be treated. In the case of higher BOD-values, several filters can be connected in series.

Furthermore, an aeration tank is preferably used before said mixing tank, in which aeration tank the liquid wastes are contacted with an air stream, preferably in a counter-current relation. This has shown to even more improve the efficiency of the purification due to the fact that solid substances are more easily settled in this way. In the purification of waste waters, the amount of solid substances is normally of the order of 20–40 mg/l in the aerated water.

Any type of structure that is suitable for anaerobic conditions can be used as a biological bed. In this connection, it should be noted that the biological bed in everyday speech is often referred to as a "filter", although it is not a true filter effect that is referred to. An especially preferable structure is disclosed in Swedish Patent No. 75-02306-9, where the used micro organisms grow on very thin glass fibres, the surfaces of which have been treated so that they are bacteriophilic. This filter structure has made it possible to use conditions which are anaerobic to over 95%. For further details concerning this type of filter reference is made to the above-mentioned Swedish Patent which is hereby incorporated by reference.

As concerns the efficiency of the process according to the invention, it can be mentioned that a result of about 90% of removed BOD has been achieved with such a short retention time as about 1.2 hours. However, of at least the same interest is the amount of removed COD (chemical oxygen demanding substance). Thus, COD is by no means harmless to the environment because it is retained therein and is slowly degraded into biological materials, whereby exactly the same growth of algae, etc. as for BOD takes place. It is thus only a question of a postponed process. Therefore, from a modern purification point of view, the reduction of COD is a more interesting measure of the purification effect. When using the same short retention time as was mentioned above, i.e. 1.2 hours, about 90% removal of COD has been achieved.

The other conditions used in the purification process are in principle similar to those which are conventionally used. This means, for example, that when purifying waste waters, the temperature of the feed water is generally between 10° and 30° C. and the pH-value is generally from 5.5 to 8. An advantage with the addition of extra-cellular enzymes according to the invention is that it has very little effect on the pH-value, which is only lowered by about one tenth, which means that generally the enzyme addition does not necessitate any special pH-adjustment in order to obtain optimal conditions in the filter. For other types of liquid wastes, for example from industries, an adjustment of the pH may be necessary before the liquid is fed into the purification process according to the invention, wherein the pH should preferably be between 5.5 and 7.5, more preferably between 6.8 and 7.3. As a comparison, it could be mentioned that an addition of intra- as well as extra-cellular enzymes can cause a relatively great lowering of the pH, namely up to 2 pH-units. Furthermore, the process according to the invention can of course be utilized in connection with other conventional purification steps. For example, a primary de-sludging operation in a prior step and/or chlorination (e.g. in the production of drinking-water) in a subsequent step may be employed. If larger amounts of oils or fats are present, it can be preferable to separate in an initial step, these substances from the wastes, which is performed in any conventional way, such as by flocculation or any other chemical or physical treatment. In the case of smaller amounts, it is generally sufficient to perform the above-mentioned aeration. Toxic substances, e.g. heavy metal ions and free chlorine, should of course also be removed, which is preferably achieved by precipitation and aeration, respectively.

The process according to the invention is very well suited for continuous operation, especially in view of the extremely small amounts of sludge formed, i.e. in accordance with the fact that there is not any clogging of the biological bed, and with reference to the fact that the production according to the invention of the extra-cellular enzymes is extremely well suited for continuous operation, which in addition can be performed in a very cheap way, thanks to the advantageous separation method. As was mentioned above, the addition of enzymes is preferably kept constant, while the retention time in the filter can be varied.

BRIEF DESCRIPTION OF THE DRAWINGS

The process according to the invention will be described further in connection with the accompanying drawing, in which:

FIGS. 1 and 2 show the principal graphs for the growth of the anaerobic micro organisms according to the known technique and according the the present invention, i.e. without and with addition of extra-cellular enzymes, respectively. The abscissa indicates the time expressed in weeks, while the ordinate indicates millions of micro organisms per ml of liquid. Furthermore, in FIG. 1 it is marked how a disturbance of oxygen affects the growth. This disturbance occurs after about 2.5 weeks in the illustrated case.

FIG. 3 schematically shows a preferred embodiment of a plant for carrying the process according to the invention into effect. This plant comprises an enzyme production unit A and a filter unit B. The enzyme production unit A comprises a tank 1 for nutrient solution, a cultivation tank 2, a separation tank 3 and a storage tank 4. The filter unit B comprises an aeration tank 5, a mixing tank 6 and a filter 7.

Figure 1:
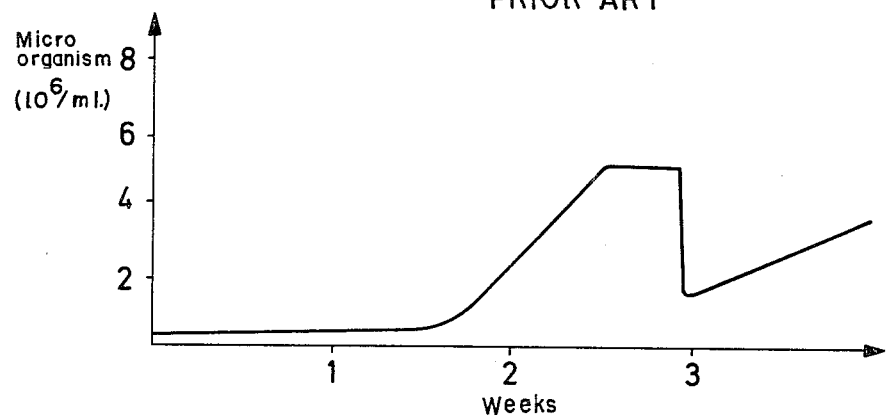
FIG. 1 shows a graph regarding the growth of micro organisms in an anaerobic process according to the prior art.
Figure 2:
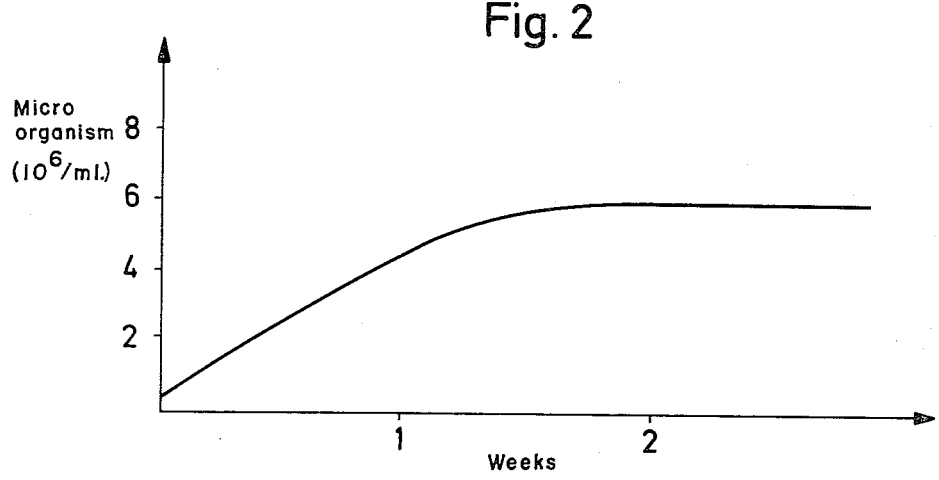
FIG. 2 shows a graph regarding the growth of micro organisms in an anaerobic process according to the present invention.

The production of enzymes in the unit A can be described as follows. The nutrient solution used for the cultivation of bacteria is prepared through mixing in the tank 1 and pumped through the tube 8 into the cultivation tank 2, which is also fed with air via the tube 9. The cultivation tank 2 contains the mixture of bacteria which is especially selected for the liquid wastes and is provided with equipment (not shown) for continuous control and adjustment of pH and temperature. The temperature, pH and aeration are controlled so that the conditions in the tank 2 become optimal for the growth of the selected bacteria and the ensuing production of enzymes. The temperature should be between 15° C. and 50° C., preferably about 25° C., and the pH-value should be between 3 and 8, preferably about 7. The supply of air should be such as to impart to the water an oxygen content of between 0.5 mg/l and 8 mg/l, preferably about 2 mg/l. Depending on the type of species utilized, the bacteria are allowed to grow in the cultivation tank for between 0.5 and 6 hours, preferably about 5 hours, before a separation of the formed extra-cellular enzymes is started. The bacteria in the cultivation tank are chosen with regard to what extra-cellular enzymes are wanted which is in turn dependent on what organic substances are to be degraded.

The nutrient solution is adapted to the selected bacteria and the concentration of nutrient is chosen so as to cause a rapid growth of the bacteria, but the concentration of nutrient must not be so high as to cause an inhibition of the growth of the bacteria.

The produced enzyme solution is then passed to the separation tank 3 through an upwardly leaning tube 10. In the illustrated case, the angle V between said tube and the side of the cultivation tank 2 is 45°. The separation tank 3 does not contain any nutrient solution, and when the enzyme solution, when separated, is passed upwards through the inclining tube 10, the supply of nutrient is gradually decreased, whereby the bacteria will die and slowly fall back to the bottom of the cultivation tank 2. Thus, it is very easy to obtain in the separation tank 3 an enzyme solution having a very high proportion of extra-cellular enzymes. Only very small amounts of bacteria will follow into the separation tank 3, (such a small number as about 100 bacteria/ml of solution has been achieved), wherein they will die, due to lack of nutrient, and can be separated from the extra-cellular enzymes. Furthermore, in the illustrated embodiment there is also a special storage tank 4, to which the extra-cellular enzymes are transferred via the tube 11 and stored for further transfer to the filter unit B.

The concentration of extra-cellular enzymes in the separation enzyme solution which is withdrawn through the tube 11 depends on the retention time for the bacteria in the cultivation tank 2. This retention time is chosen so as to enable each bacterium to reach maximum development. The flow of nutrient from the tank 1 to the tank 2 and of enzyme solution from the tank 2 to the tank 3 and the rate at which the extra-cellular enzyme solution is drained from the tank 3, are chosen so as to impart to the bacteria this optimal retention time in the cultivation tank 2.

As the bacteria will reach a maximum development after about 0.5-6 hours, this maximal development can be kept continuously by first allowing the bacteria to grow for 0.5-6 hours in the cultivation tank 2 and then withdrawing the enzyme solution from the separation tank 3 at such a rate that the retention time for the bacteria in the cultivation tank 2 will continuously be kept at such a level that the bacteria will get maximum development therein. In this way, the maximum amount of enzymes can be produced per unit of time and amount of nutrient.

From the cultivation tank 2 bacteria and remaining nutrient are withdrawn through the tube 12 and similarly optional bacteria from the tank 3 through the tube 13. The tubes 12 and 13 are joined into a tube 26 for recycling the nutrient into the tank 1 (after a not shown separation of dead bacteria).

As to the filter unit the following applies.

The liquid wastes, which have preferably been subjected to a primary de-sludging operation in an initial step (not shown), are fed into the top of the aeration tank 5 through the tube 14 and are brought into counter-current contact with air fed at 15. This air contributes partly to a separation of further sludge particles, which are withdrawn at the bottom of the tank 5 through the tube 16 and further through the withdrawal tube 17, which is common to all three tanks, and partly to cause the waste to be in such a state that their continuing degradation in the tanks 6 and 7 is facilitated.

At the top of the tank 5, the aerated wastes are withdrawn through the tube 18 and directed into the upper part of the mixing tank 6. The extra-cellular enzymes stored in the enzyme production unit A and in the storage tank 4 are also fed to the top of the tank 6 via the tube 19. Furthermore, the mixing tank is preferably provided with a stirrer (not shown). Sludge that is formed in the tank 6 is withdrawn from the bottom of the tank through the tube 20 and further via the common tube 17.

After a suitable treatment time in the tank 6, the wastes with the added extra-cellular enzymes are withdrawn through the tube 21, which leads from the upper part of the tank 6 to the upper part of the filter 7. This filter is of the type described in the above-mentioned Swedish Patent, i.e. with a very large amount of freely hanging glass fibres 22, which have been made bacterophilic and on which the active micro organisms thus grow. The purified wastes are withdrawn through the tube 23, while sludge is drained from the bottom of the filter 7 through the tube 24 and further through the tube 17. The withdrawal tube 23 is arranged at such a height above the bottom that sludge is not withdrawn therethrough. By controlling the feed and withdrawal flows, the filter is maintained completely filled with liquids, i.e. the level of liquids is above the glass fibres, whereby substantially anaerobic conditions can be maintained.

The micro organisms used in the filter need not be any specific bacteria, but anaerobic "earth bacteria" are preferably used. The bacteria are preferably facultative as well as obligate anaerobic bacteria, and under the conditions used in the filter, a "separation" of facultative and obligate bacteria takes place in the filter column.

In the upper part of the column, approximately 3% of the volume, the conditions are aerobic. In this part the facultative bacteria will dominate, which bacteria will, of course, adapt themselves to the aerobic conditions. It is essentially in this part of the filter that sludge is formed, as a formation of methane can not take place.

In the part of the filter which is immediately below the surface layer, the facultative anaerobic bacteria will be dominant to the obligate anaerobic bacteria. This is due to the oxygen content which is generally in this part of the filter within the range of 1–0 mg of $O_2$ per liter.

In the lower part, or rather the major part, of the filter the oxygen content is 0. Here the obligate anaerobic bacteria are predominant to the facultative ones, and the formation of sludge is extremely small.

By using obligate as well as facultative anaerobic bacteria, it has shown possible to maintain optimal bacteriological conditions throughout the filter, which results in a rapid degradation i.e. a short retention time, and low production of sludge.

The process according to the invention has been tested in a pilot plant in accordance with the following example.

EXAMPLE

Figure 3:
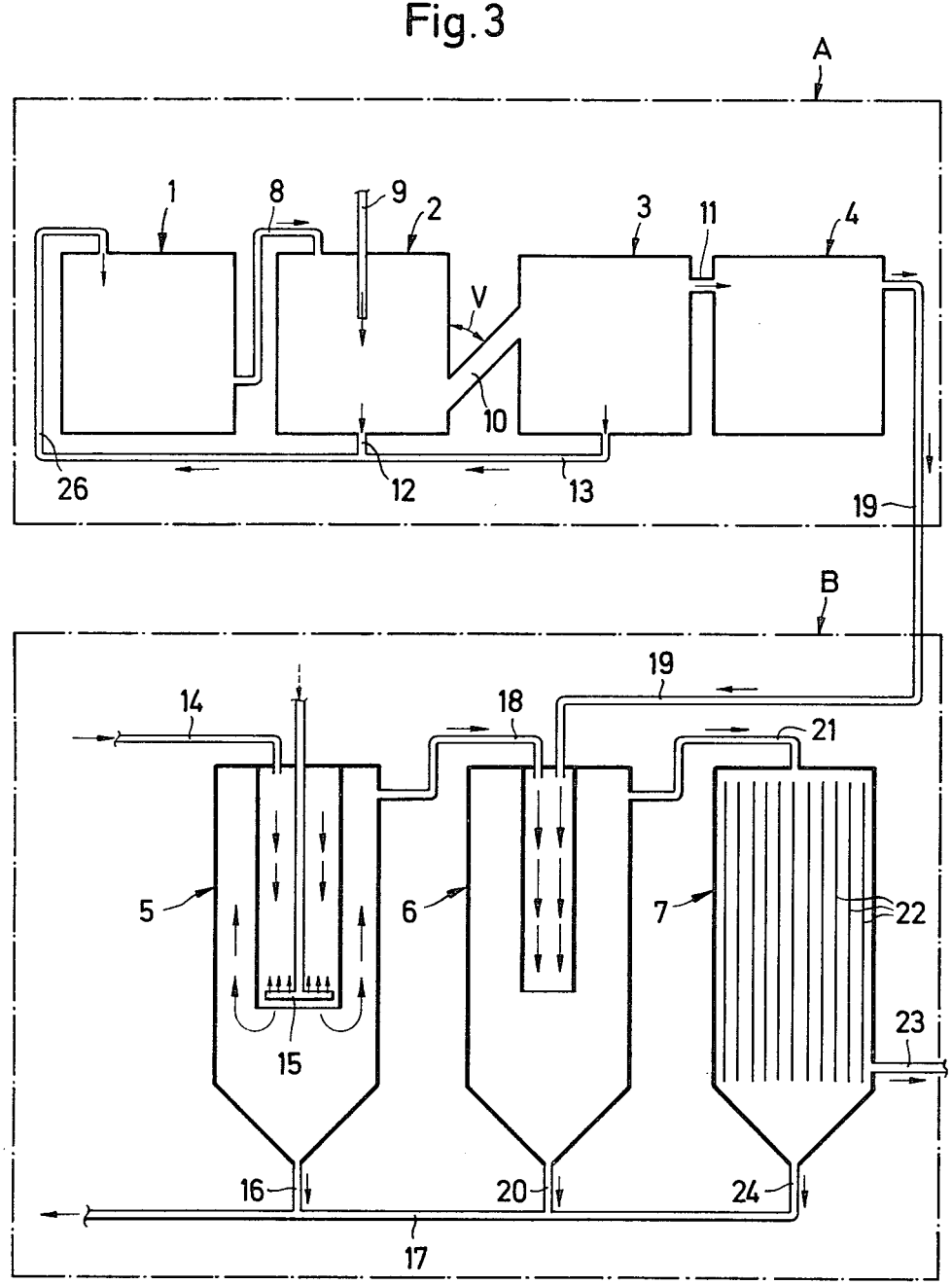
FIG. 3 shows an especially preferred plant for carrying into effect the biological purification process according to the invention.

The plant was built in the way illustrated in FIG. 3. In the enzyme production unit A, each tank had a volume of 5 liters and the angle V for the tube 10 was 45°. The three tanks of the filter unit were of the same dimensions, namely a diameter of 0.5 m and a height of 2.2 m and a conical bottom settling part, as is shown in the Figure. The filter tank 7 was filled with freely hanging, flexible bacteriophilic glass fibres with a diameter of 0.013 mm. The filter tank contained such fibres in a number of 50,000 per $cm^2$ of its cross section. The active volume of the filter tank 7, i.e. the volume occupied by fibres, was 0.35 $m^3$.

In the plant a pre-filtered domestic waste water was purified, which water had not been subjected to any chemical treatment, such as, for example flocculation. The composition of the water is disclosed in Table I.

The extra-cellular enzymes required for the purification operation were produced in the following way: In the tank 1, a nutrient solution was prepared by dissolution of whey powder in water. The concentration was about 1.5%, i.e. 15 grams of whey powder were dissolved per liter of tap water. The composition of the whey solution was 93% of $H_2O$ and 7% of solid substances. The solid substances consisted of 4.9% of lactose, 0.2% of $FeSO_4.7H_2O$, 0.5% of $CaCO_3$ and 0.5% of NaCl. The nutrient solution was passed from the tank 1 to the tanks 2 and 3 until the whole system was filled with nutrient solution. The temperature in the cultivation tank 2 was maintained at 25° C. and the pH was maintained between 6.7 and 7.1. The supply of air to the tank 2 was adjusted so that the oxygen level of the nutrient solution became 2-2.5 mg of $O_2$/liter. Bacteria were then incorporated into the cultivation tank. In this case, iron bacteria, sulphate bacteria, nitrification bacteria, hydrogen bacteria and purple bacteria, were used. From each group there were added such an amount of bacteria that the number of bacteria from each group in 1 ml of nutrient solution was 500 bacteria. The solution in the cultivation tank was kept under stirring and the bacteria were allowed to grow for 5 hours.

The separation was started by transferring the solution in the tank 2 to the tank 3 at the same rate as the one with which new nutrient solution was transferred from the tank 1 to the cultivation tank 2. When the level in the separation tank 3 had reached the outlet 11, the transferring of enzyme suspension to the storage tank 4 was started. The amount of enzymes of the formed enzyme suspension was determined by first separating dead cells by centrifugation at 3200 r/min, whereby dead cells as well as intra-cellular enzymes enclosed therein, were separated. The remaining suspension of enzymes was then membrane filtered, the amount of enzymes being determined to be 0.01 mg/l corresponding to an activity of 60%. As it is well known that the amount of intra-cellular enzymes is constant at the used bacterial concentration, and on the order of $10^{-12}$ g/ml, even if the whole amount of intra-cellular enzymes were to be liberated, the formed suspension would still contain more than 99% of extra-cellular enzymes. However, due to the slow degradation of the bacteria in the environment poor in nutrient only a very small part of the intra-cellular enzymes contained in the bacteria will be liberated. This means that the suspension of extra-cellular enzymes which is separated from the bacteria in the dead phase, can be considered as 100%.

The filtered waste water was passed through the tube 14 into the aeration tank 5, where it was contacted in counter-current with a current of air in order to accelerate and facilitate the settling of solid in the waste water. The inlet and outlet rates in the aeration tank were adjusted so as to obtain a retention time for the waste water in the tank of about 0.5 hours. The aerated water was passed via the tube 18 into the enzymation tank 6, from where it was fed through the vertical internal tube 25. Through the same tube the enzyme solution produced in the above-mentioned apparatus A was added via the tube 19. The addition of enzyme solution was adjusted so that to each liter of waste water there was added 1 ml of the enzyme solution, which thus contained 0.01 mg of enzymes per liter. This means that the extra-cellular enzymes were added in an amount of 0.00001 mg per liter of waste water. The addition of aerated waste water through the tube 18 and the withdrawal were controlled by the fact that the enzymation tank 6 was at a somewhat lower level than the aeration tank. The retention time for the enzymated waste water in the enzyme tank was 0.5 hours. Then, the enzymated waste water was passed to the filter tank 7 through the tube 21. The glass fibres 22, which were hanging in the filter tank, had been pre-treated with a 2% aqueous solution of NaOH for 16 hours, whereupon the NaOH-solution had been neutralized with HCl to pH 4 and left for 4 hours. The filter was then rinsed with water for 3 hours. Earth bacteria were added to the filter, which was now filled with water and bacteriophilic glass fibres, in such an amount that each ml of water in the filter contained $4 \times 10^6$ bacteria. The bacteria were allowed to grow for 48 hours before the filter was used. When the enzymated water passed through the filter, the extra-cellular enzymes reinforced the enzyme system of the anaerobically active bacteria, such that a rapid degradation of the organic impurities present in the waste water took place.

The composition of the water after the purification is stated in Table I, wherein A, B and C represent three different waste waters or rather the waste water at three different times.

TABLE I

| Retention time | IN | | | OUT | | |
|---|---|---|---|---|---|---|
| 3.5 hours | A | B | C | A | B | C |
| $BOD_7$ | 1200 | 3600 | 650 | 64 | 50 | 64 |
| COD mg/l | 3699 | 8921 | 1153 | 160 | 157 | 119 |
| $NO_3{-}$ mg/l | 3.2 | 8.2 | 3.8 | 1.0 | 3.2 | 1.5 |
| $NO_2{-}$ mg/l | 0.3 | 0.5 | 0.50 | 0.16 | 0.3 | 0.3 |
| $SO_4^{-2}$ mg/l | 35 | 60 | 25.0 | 8.5 | 20.0 | 7.0 |
| $PO_4^{-3}$ mg/l | 9.2 | 20 | 10.0 | 4.5 | 9.0 | 3.8 |
| Turbidity, STU | 165 | 62 | 175 | 30 | 10 | 25 |
| Production of sludge, kg/$m^3$ | | | | 0.0019 | 0.0034 | 0.00014 |

What is claimed is:

1. A process for the biological purification of liquid wastes wherein the wastes are contacted with active micro-organisms in a biological bed in order to achieve a degradation of organic impurities present in the wastes, which comprises:
   (a) cultivating Gram-positive bacteria in an aerobic environment rich in nutrient thereby producing a suspension of extra-cellular enzymes and bacteria;
   (b) separating the bacteria from the suspension by transferring the suspension into an environment poor in nutrient, wherein the bacteria enter into a dead phase and settle and whereby intra-cellular enzymes contained within the bacteria are separated from the suspension;

(c) adding the suspension of extra-cellular enzymes to the liquid wastes;

(d) conducting purification of the liquid wastes in the biological bed under substantially anaerobic conditions and in the presence of the extra-cellular enzymes so as to cause degradation of the wastes by means of anaerobic microorganisms; and (e) removing purified liquid wastes from the biological bed.

2. The process as claimed in claim 1, wherein the suspension of the extra-cellular enzymes is added to the liquid wastes in a mixing tank before the wastes are passed into the biological bed.

3. The process as claimed in claim 2, wherein the liquid wastes are contacted with the suspension of the extra-cellular enzymes in the mixing tank for a time of between 10 and 30 minutes.

4. The process as claimed in claim 1, wherein the extra-cellular enzymes are added in a concentration of from $0.25 \times 10^{-5}$ to $50 \times 10^{-5}$ mg of enzyme per liter of liquid wastes.

5. The process as claimed in 1, wherein the biological bed comprises a filter having a large number of freely hanging glass fibres as carriers for the anaerobic bacteria and a level of the liquid wastes which is above the glass fibres, said liquid wastes in the filter containing facultative and obligate anaerobic bacteria.

6. The process as claimed in claim 1, wherein the liquid wastes are subjected to an aeration before the suspension of the extra-cellular enzymes is added.

7. The process as claimed in claim 1, wherein the extra-cellular enzyme suspension added to the liquid wastes comprises at least 90% by weight of extra-cellular enzymes calculated on the total enzyme content.

8. The process as claimed in claims 2, 3, 4, 5, 6, 7, or 1, wherein the extra cellular enzymes are produced and separated by cultivating the Gram-positive bacteria in a first tank in an environment rich in nutrient and passing the produced suspension to a second tank with an environment poor in nutrient via an upwardly inclined tube, whereby a suspension of extra-cellular enzymes is separated from the Gram-positive bacteria and intra-cellular enzymes.

9. The process as claimed in claim 8, wherein a tube is utilized for passing the suspension to the second tank, the angle between the tube and the first cultivation tank being between 30° and 60°.

10. The process as claimed in claim 8, wherein the liquid wastes are waste waters.

* * * * *